United States Patent
Kunkel et al.

(10) Patent No.: US 6,629,725 B1
(45) Date of Patent: Oct. 7, 2003

(54) SEAT PART FOR A VEHICLE SEAT

(75) Inventors: Joachim Kunkel; Karl Pfahler, both of Stuttgart; Lothar Renner, Nufringen, all of (DE)

(73) Assignee: DaimlerChrysler AG, Stuttgart (DE)

(*) Notice: Subject to any disclaimer, the term of this patent is extended or adjusted under 35 U.S.C. 154(b) by 300 days.

(21) Appl. No.: 09/713,206

(22) Filed: Nov. 16, 2000

(30) Foreign Application Priority Data

Nov. 16, 1999 (DE) .......................... 199 54 978

(51) Int. Cl.$^7$ ................................ A47C 7/72
(52) U.S. Cl. .................... 297/180.12; 297/180.14; 297/452.47
(58) Field of Search ................ 297/180.11, 180.12, 297/180.13, 180.14, 452.43, 452.44, 452.46, 452.47; 5/652.2

(56) References Cited

U.S. PATENT DOCUMENTS

| | | | |
|---|---|---|---|
| 3,137,523 A | * 6/1964 | Karner | 297/180.13 |
| 4,413,857 A | * 11/1983 | Hayashi | 297/180.11 |
| 5,516,189 A | 5/1996 | Ligeras | 297/180.11 |
| 5,902,014 A | 5/1999 | Dinkel et al. | 297/452.43 |
| 5,927,817 A | * 7/1999 | Ekman et al. | 297/180.14 |
| 6,068,332 A | * 5/2000 | Faust et al. | 297/180.13 |
| 6,179,706 B1 | * 1/2001 | Yoshinori et al. | 297/180.14 |
| 6,189,966 B1 | * 2/2001 | Faust et al. | 297/180.13 |

FOREIGN PATENT DOCUMENTS

DE    196 28 698 C1    7/1996

* cited by examiner

Primary Examiner—Anthony D. Barfield
(74) Attorney, Agent, or Firm—Crowell & Moring LLP

(57) ABSTRACT

A seat part for a vehicle seat having a seat cushion which is covered over by an air-permeable cushion cover, can be actively ventilated and on the top surface of which there are formed, by stitched-down seams, a central and a front level seat surface and two border beads which bound the level seat surfaces laterally. The seat having a heating mat which is arranged between the seat cushion and cushion cover and belongs to an electric seat heater. In order to ensure that the seat cushion has good through-ventilation and is dimensionally stable over a long period of time, the heating mat is perforated, and the perforations of the heating mat are designed to be considerably sparser in the region of the central level seat surface than in the region of the front level seat surface and the border beads.

9 Claims, 1 Drawing Sheet

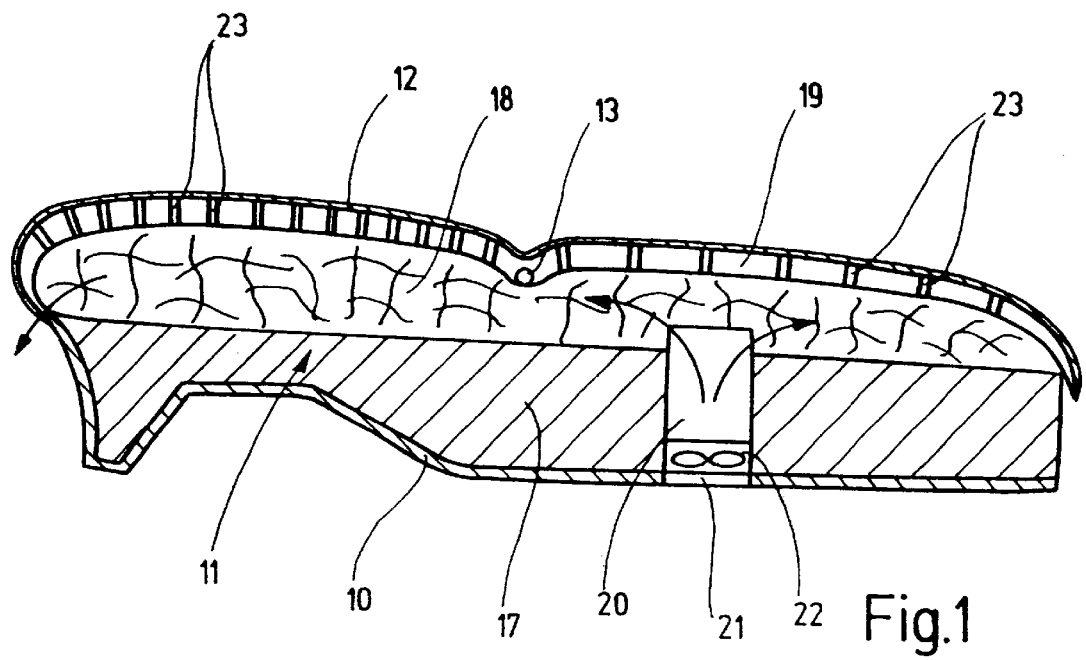
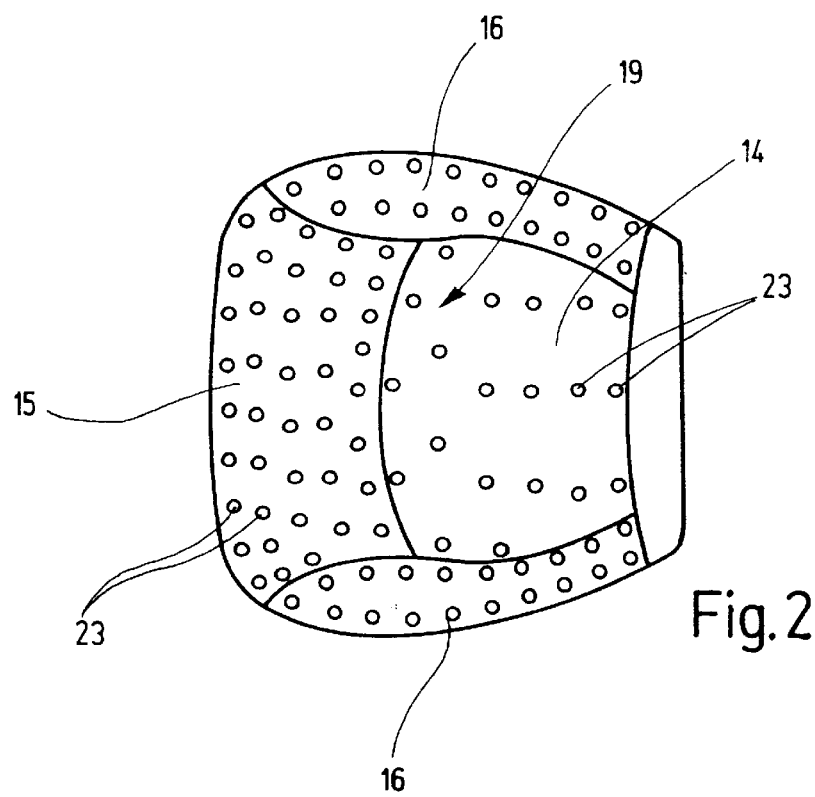

SEAT PART FOR A VEHICLE SEAT

BACKGROUND AND SUMMARY OF THE INVENTION

This application claims the priority of German Patent Document 199 54 978.8, filed Nov. 16, 1999, the disclosure of which is expressly incorporated by reference herein.

The invention relates to a seat part for a vehicle seat of the type where a seat cushion which is covered by an air-permeable cushion cover, with at least one foam support and can be actively ventilated, and on a top surface of the seat part formed by stitched-down seams are a central and a front level seat surface and two border beads which bound the level seat surfaces laterally, said seat part having a heating mat arranged between the seat cushion and the cushion cover, said heating mat belonging to an electric seat heater.

In a known seat part of this type, shown in German Patent Document DE 196 28 698 C1, corresponding to U.S. Pat. No. 5,902,014, the seat cushion comprises a foam support accommodated by a cushion carrier, and a ventilation layer which covers the foam support over its entire surface area, capable of air flowing through it and made of a coarse-meshed knitted spacing fabric, and a pressure-distributing layer which rests on the ventilation layer and made of nonwoven fabric or open-cell foam. Introduced between the cushion cover and the pressure-distributing layer is a cover filling which is made of wool fleece or cut open-cell foam and accommodates the electrical heating conductors of the electric seat heater. For active ventilation of the seat cushion, the foam support has a multiplicity of air channels passing through it, said channels opening out, on the one hand, at the ventilation layer and, on the other hand, at the underside of the foam support, said underside being directed away from the ventilation layer. Inserted in each air channel is a miniature fan which takes in air beneath the seat cushion and blows it into the ventilation layer. The air spreads out in all directions in the knitted spacing fabric and, when the seat is not occupied, flows through the air-permeable cushion cover, which brings about rapid cooling of the cushion surface which has been heated, for example, by the sun. When the seat is occupied, the air flows along in the knitted spacing fabric of the ventilation layer and emerges again at the open ends of the seat cushion. It produces an air humidity gradient in this case and leads away the air humidified by the individual sitting on the seat. On account of the layer construction of the seat cushion, such a seat part has very good through-ventilation and long-term dimensional stability, but its high production costs mean that it is only used in vehicles in the upper price bracket.

In a likewise known vehicle seat described in U.S. Pat. No. 5,516,189, the heating conductors of the electric seat heater are embedded in a rubber or foam layer around which a cover made of flexible plastic or textile material is positioned. Such a completely preassembled heating mat facilitates the production of the seat cushion and seat.

An object of the invention, in the case of a seat part with seat heater for vehicle seats of the type mentioned above, is to ensure good through-ventilation and long-term dimensional stability.

This object is achieved by a perforated heating mat where the perforations are designed to be substantially sparser in an area of the central level seat surface than in areas of the front level seat surface and the border beads.

The seat part according to an embodiment of the invention has the advantage that optimum air guidance and good ventilation of the seat region are achieved by the perforation arrangement of the heating mat. According to a preferred embodiment of the invention, in order to reduce the production costs, a rubberized-hair layer serving for guiding and distributing air in the seat cushion covers the foam support directly, and the heating mat rests on the top side of the rubberized-hair layer. In addition, the reduction in the number of perforation holes per unit surface area in the region of the central level seat surface, which predominantly absorbs the seat pressure, achieves optimum sitting comfort and relatively long-lasting dimensional stability of the foam material of the foam support.

Advantageous embodiments of the seat part according to the invention along with expedient developments and configurations of the invention are constant diameter perforation holes and the foam support has a plurality of air channels pass through the foam support, said channels opening out at the rubberized-hair layer and at an underside of the foam support, said underside directed away from the rubberized-hair layer, and arranged in each of the air channels is a miniature fan which blows air towards the rubberized-hair layer.

According to an advantageous embodiment of the invention, the density of the perforation holes in the region of the central level seat surface is reduced to approximately half the density of the rest of the perforation holes. Such a reduction in the perforations in the central level seat surface has proven particularly expedient in providing a balance between through-ventilation and dimensional stability.

The invention is described in more detail hereinbelow with reference to an exemplary embodiment illustrated in the drawing by schematic illustrations.

Other objects, advantages and novel features of the present invention will become apparent from the following detailed description of the invention when considered in conjunction with the accompanying drawings.

BRIEF DESCRIPTION OF THE DRAWINGS

FIG. 1 shows a longitudinal section of a seat part for a vehicle seat; and

FIG. 2 shows a plan-view of a seat part in FIG. 1.

DETAILED DESCRIPTION OF THE DRAWINGS

The seat part which is illustrated schematically in longitudinal section in FIG. 1 and is intended for a vehicle seat has a seat cushion 11 which is accommodated by a cushion carrier 10 and is covered over by an air-permeable cushion cover 12. Formed on the top surface of the seat, by stitched-down seams 13, are a central level seat surface 14, a front level seat surface 15 and two border beads 16 which bound the level seat surfaces 14, 15 laterally. The seat cushion 11 comprises a foam support 17 resting on the cushion carrier 10, and a rubberized-hair layer 18 which covers the foam support 17 over its entire surface area and can have air flowing through it. A heating mat 19 of an electric seat heater is introduced between a rubberized-hair layer 18 and the cushion cover 12. The foam support 17 has a plurality of air channels 20 passing through it, said channels opening out, on the one hand, at the rubberized-hair layer 18 and, on the other hand, at the underside of the foam support 17. The underside channel being directed away from the rubberized-hair layer 18. In the exemplary embodiment, the air channels 20 are spaced apart one beside the other in the transverse direction of the seat. Only one air channel 20 can thus be seen in FIG. 1. Openings 21 which are congruent with the mouths of the air channels 20 are provided in the cushion carrier 10. Inserted in each air channel 20 is a miniature fan 22, of which the blowing-out direction is directed towards the rubberized-hair layer 18. The incorporated miniature fans 22 take in air from the area beneath the seat part and blow it into the rubberized-hair layer 18. The air flows through the rubberized-hair layer 18 in all directions and emerges out of the seat cushion 11 again at the ends of the rubberized-hair layer 18. In particular when the seat part is unoccupied, some of the air flows out via the air-permeable cushion cover 12 and can thus ventilate the top surface of the seat part.

In order to ensure that air flows through to good effect from the rubberized-hair layer 18 to the cushion cover 12, the heating mat 19, which is introduced between the rubberized-hair layer 18 and cushion cover 12, is perforated over its entire surface area. As can be seen from FIG. 2, the perforations are such that they are considerably sparser in the region of the central level seat surface 14 than in the region of the front level seat surface 15 and of the border beads 16. Perforation arrangements for the central level seat surface 14 in which the number of perforation holes 23 per unit surface area is half that in the rest of the seat surface have proven particularly favorable here. The diameter of the perforation holes 23 is preferred to be constant in this case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat part for a vehicle seat, having a seat cushion which is covered by an air-permeable cushion cover, with at least one foam support and can be actively ventilated, and on a top surface of the seat part formed by stitched-down seams are a central and a front level seat surface and two border beads which bound the level seat surfaces laterally, said seat part having a heating mat arranged between the seat cushion and the cushion cover, said heating mat belonging to an electric seat heater, wherein the heating mat is perforated, and the perforation holes are designed to be substantially sparser in an area of the central level seat surface than in areas of the front level seat surface and the border beads.

2. The seat part according to claim 1, wherein a density of the perforation holes in the area of the central level seat surface is approximately half a density of the perforation holes in the areas of the front level seat surface and the border beads.

3. The seat part according to claim 2, wherein all of the perforation holes have the same diameter.

4. The seat part according to claim 3 wherein the seat cushion has a rubberized-hair layer which rests on the foam support and the heating mat rests on top of the rubberized-hair layer and is directed away from the foam support.

5. The seat part according to claim 2, wherein the seat cushion has a rubberized-hair layer which rests on the foam support and the heating mat rests on top of the rubberized-hair layer and is directed away from the foam support.

6. The seat part according to claim 1, wherein all of the perforation holes have the same diameter.

7. The seat part according to claim 1, wherein the seat cushion has a rubberized-hair layer which rests on the foam support and the heating mat rests on top of the rubberized-hair layer and is directed away from the foam support.

8. The seat part according to claim 7, wherein a plurality of air channels pass through the foam support, said channels opening out at the rubberized-hair layer and at an underside of the foam support, said underside directed away from the rubberized-hair layer, and arranged in each of the air channels is a miniature fan which blows air towards the rubberized-hair layer.

9. Method of making a seat part for a vehicle seat, comprising the acts of:

providing the seat part having a seat cushion which is covered by an air-permeable cushion cover, can be actively ventilated and includes at least one foam support; and forming by stitched-down seams on a top surface of the seat part a central and a front level seat surface and two border beads which bound the level seat surfaces laterally;

wherein said seat part has a heating mat arranged between the seat cushion and the cushion cover, said heating mat belonging to an electric seat heater and perforated, the perforation holes designed to be substantially sparser in an area of the central level seat surface than in areas of the front level seat surface and the border beads.

\* \* \* \* \*